United States Patent [19]

Haas et al.

[11] Patent Number: 4,641,678
[45] Date of Patent: Feb. 10, 1987

[54] CONTROLLABLE DIFFUSER FOR AN AIR INTAKE OF AN AIRCRAFT

[75] Inventors: Jan T. Haas, Hamburg; Robin-Leslie Hadwin, Buxtehude, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 807,162

[22] Filed: Dec. 9, 1985

[30] Foreign Application Priority Data

Dec. 8, 1984 [DE] Fed. Rep. of Germany ....... 3444822

[51] Int. Cl.$^4$ .............................................. B64D 33/02
[52] U.S. Cl. .................................. 137/15.1; 244/53 B
[58] Field of Search ..................... 244/53 B; 137/15.1, 137/15.2

[56] References Cited

U.S. PATENT DOCUMENTS

| 2,971,331 | 2/1961 | Silverman | 137/15.1 |
| 3,265,331 | 8/1966 | Miles | 244/53 B |
| 3,443,598 | 5/1969 | Pierce | 137/15.1 X |
| 3,941,336 | 3/1976 | Navgia | 137/15.1 X |
| 4,025,008 | 5/1977 | Peikert | 37/15.2 X |

FOREIGN PATENT DOCUMENTS

| 2545019 | 4/1977 | Fed. Rep. of Germany | 137/15.1 |
| 1134495 | 3/1966 | United Kingdom . | |

OTHER PUBLICATIONS

U.S. Periodical "Aircraft" of Sep./Oct. 70, pp. 431 to 436, copy enclosed herewith.

Primary Examiner—Alan Cohan
Attorney, Agent, or Firm—W. G. Fasse; D. H. Kane, Jr.

[57] ABSTRACT

A diffuser for an air intake of an aircraft has an inlet and an outlet, both with variable cross-sectional flow areas. At least one wall section of a diffuser defining flow channel is movable by one or separate lever linkage systems for varying the inlet and outlet cross-sectional flow areas. A control circuit, preferably a closed loop control circuit responsive to a control program, makes sure that optimal flow cross-sectional areas are maintained at the inlet and outlet of the diffuser to optimize the operation of the diffuser.

7 Claims, 11 Drawing Figures

CONTROLLABLE DIFFUSER FOR AN AIR INTAKE OF AN AIRCRAFT

FIELD OF THE INVENTION

The invention relates to a controllable diffuser for an air intake of an aircraft having a variable inlet cross-sectional flow area and an outlet cross-sectional flow area.

DESCRIPTION OF THE PRIOR ART

Diffusers of the above type are required in systems installed in an aircraft, for example, in an aircraft engine or in an air conditioning system of an aircraft. Such diffusers take air out of the flow around the aircraft and supply it to the respective system with a certain pressure head or as so-called "ram air". These systems generally require different air quantities depending on their instantaneous operational state. Therefore, the respective diffusers have a variable geometry at the diffuser inlet in order to achieve an optimal adaptation of the diffuser to the instantaneous operational state, whereby even the flight speed must be taken into account in order to keep any losses resulting from the transformation of the kinetic energy of the air into pressure energy as small as possible.

A generally known construction of such a variable diffuser comprises a variable inlet cross-sectional flow area and a diffuser outlet having a constant cross-sectional area. Thus, when the inlet cross-sectional flow area is varied, the ratio of the constant outlet cross-sectional flow area to the variable inlet cross-sectional flow area also varies. Additionally the opening angle of the diffuser also varies in response to the varying of the inlet cross-sectional flow area. An expansion which, inside the diffuser, is substantially free of any flow separation from the diffuser walls, depends on the just mentioned two parameters, namely the flow area ratio and the widening or expansion angle of the diffuser. Further, both parameters are coupled with each other due to the geometry of the diffuser. As a result, the available control or regulating range is relatively small. In order to achieve an optimal operation, especially at the control limits, such a diffuser would have to have a substantial structural length.

OBJECTS OF THE INVENTION

In view of the foregoing it is the aim of the invention to achieve the following objects singly or in combination:

to construct a diffuser of the type mentioned in such a manner that it has an increased control range or control characteristic even if it has a small structural length;

to assure an optimal control of the diffuser inlet and outlet cross-sectional areas so that the diffuser efficiency will be optimal; and to control the diffuser inlet cross-sectional area and the diffuser outlet cross-sectional area in accordance with a desirable control characteristic, whereby the respective areas may be controlled together or separately, even in accordance with a computer program.

SUMMARY OF THE INVENTION

The diffuser according to the invention comprises a diffuser outlet cross-sectional area which is also variable either together with the control of the inlet cross-sectional flow area or independently of the control of the inlet cross-sectional flow area.

The advantages achieved according to the invention include an increased control range simultaneously with a smaller structural length of the diffuser as compared to the prior art. Further, a relatively simple lever linkage system, including pivot or journal joints, may be used for controlling the respective flow areas, whereby a simple control system results. By using a suitable drive for operating the kinematic lever linkage system the diffuser can be automatically controlled and adapted to different operational states, even in accordance with a program.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
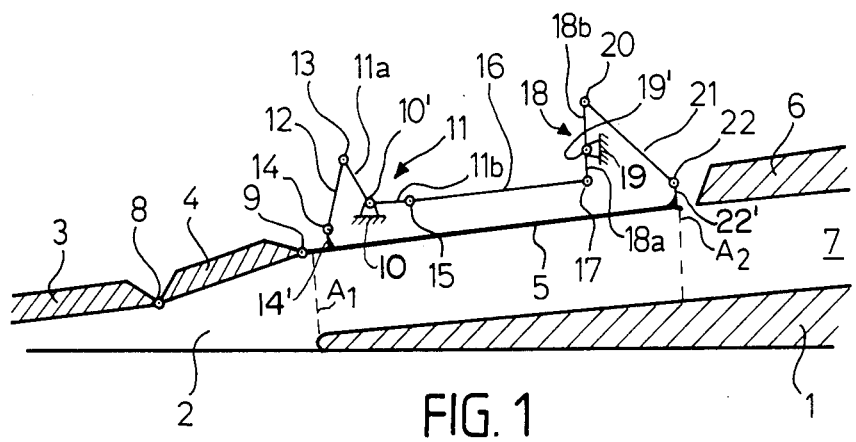
FIG. 1 shows a cross-sectional view through a diffuser according to the invention having a movable wall section illustrated in a position taken up when the aircraft is on the ground.

FIG. 1 shows an aircraft outer wall 1 with a so-called NACA inlet port 2 formed by a fixed wall member 3 and a movable or pivotal wall member 4, as well as a further wall section 5 leading toward an inner aircraft wall 6. These wall means form a flow channel 7 for the diffuser. The inlet portion of the flow channel formed by the aircraft wall 1, the wall members 3 and 4, as well as the wall section 5, has an inlet cross-sectional flow area A1 and an outlet cross-sectional flow area A2. A hinge or pivot 8 journals the wall member 4 to the fixed wall member 3. The rear end of the wall member 4 is hinged by a journal 9 to the movable wall section 5 of the diffuser. A bell crank lever 11 having arms 11a and 11b is secured with its pivot point or journal 10' to a fixed point 10 of the aircraft structure. Thus, the crank arms 11a and 11b are able to turn about the pivot point 10'. A lever link 12 is pivoted at 13 to one end of the bell crank lever arm 11a. The other end of the lever link 12 is pivoted at 14 to a point 14' of the movable wall section 5 near the leading end of the movable wall section 5 which is pivoted at 9 to the wall member 4. The other crank arm 11b of the bell crank lever 11 is pivoted by a pivot or hinge 15 to a further lever link 16 which in turn is pivoted by a journal 17 to a bell crank type of lever 18 having two arms 18a and 18b and being journalled at 19' to a further fixed point 19 of the aircraft structure. The two arms 18a and 18b of the bell crank type lever 18 are rigidly interconnected so that they can rotate in unison about the pivot or journal 19'. The outer end of the bell crank lever arm 18b is journalled through a pivot 20 to a further lever rod 21 which in turn is pivoted or journalled at 22 to a point 22' near the trailing end or edge of the movable wall section 5.

In the position of the wall member 4 and of the movable wall section 5 of the diffuser as shown in FIG. 1, the inlet cross-sectional flow area A1 has its maximum value as is required when the aircraft is still on the ground.

Figure 2:
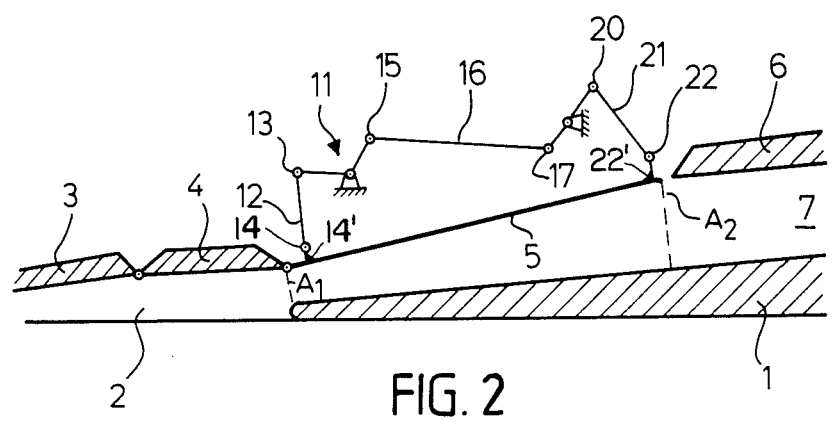
FIG. 2 is a sectional view similar to that of FIG. 1, but showing the movable diffuser wall section in a position when the aircraft flies at relatively low speeds.

FIG. 2 illustrates the diffuser of FIG. 1 in which the cross-sectional flow area A1 at the inlet has been reduced by an operation of the above described lever linkage system in such a way that the outlet cross-sectional flow area A2 remains substantially the same as in FIG. 1 providing a diffuser flow channel configuration which has a relatively large opening angle from its inlet end at A1 to its outlet end at A2, whereby the widening flow channel cross-sectional area from left to right facilitates the conversion of the kinetic energy of the air entering with the flight speed, into pressure energy. In order to establish this configuration as shown in FIG. 2, the bell crank lever 11 is driven by a drive member in a counterclockwise direction until the optimal flow cross-sectional area ratio A2/A1 is reached. Due to the translation of this motion through the lever elements 11, 18 and the journals 13, 14, 15, 17, 20, and 22, and through the lever rods 12, 16, 21, the trailing edge of the movable wall section 5 does not yet move to any appreciable degree in a direction extending substantially crosswise to the flow direction from left to right in the channel 7. Thus, the cross-sectional flow area A2 in FIG. 2 remains substantially the same as in FIG. 1.

Figure 3:
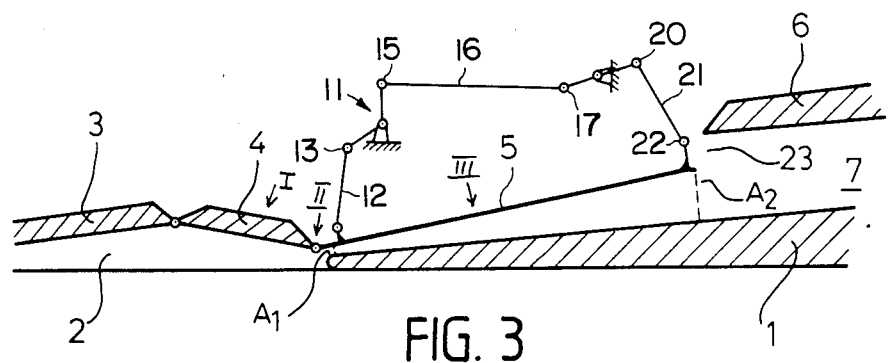
FIG. 3 is a sectional view similar to that of FIGS. 1 and 2, but showing the movable diffuser wall section in a position at higher flight speeds of the aircraft.

FIG. 3 shows the diffuser after the cross-sectional flow area A1 and the cross-sectional flow area A2 have been reduced as compared to FIGS. 1 and 2. This position of the movable wall section 5 is achieved by the further rotating of the control linkage as illustrated in FIG. 1.

Due to the reduction of the flow area A2 the opening angle remains within a sufficiently small range in spite of the now very small cross-sectional flow area at A1. Thus, a flow separation within the diffuser is avoided. Downstream of the outlet cross-sectional flow area A2 the flow area again widens due to the step 23. As a result, flow separation or detachment takes place and is actually intended. This flow separation takes place only after a substantial transformation or conversion of the kinetic flow energy into compression energy has taken place. In this manner, or rather, due to the step 23, an uncontrolled spreading of the separation or detachment zone into the diffuser upstream of the flow area A2 is prevented. This feature of the invention has the further advantage that any noise generation that would otherwise take place as a result of flow separation, is avoided and the respective stress to the aircraft structure is also eliminated.

Figure 5:
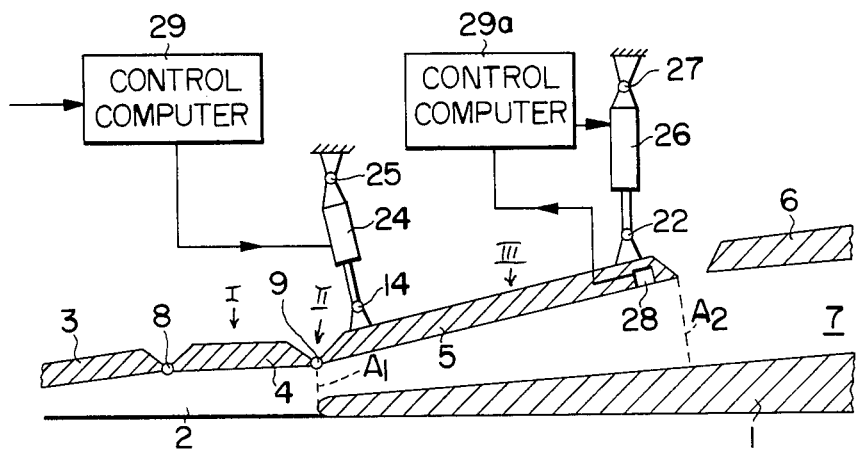
FIG. 5 illustrates a circuit arrangement including sensor means and programmed control means for operating the movable wall section so that it takes up automatically an optimal position.
Figure 6:
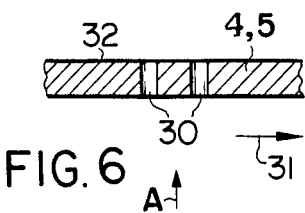
FIGS. 6 through 11 illustrate openings in diffuser wall portions for controlling the boundary layer.

As mentioned, the drive of the control linkage through a drive motor connected to the bell crank lever 11 may be part of a control circuit arrangement, especially a closed loop control circuit arrangement which uses the output values of sensors measuring the pressure and the temperature, whereby the respective motor may be driven in accordance with a given program automatically to achieve the optimal configuration of the diffuser for any particular operating condition as is shown in FIGS. 5 and 6.

Figure 4:
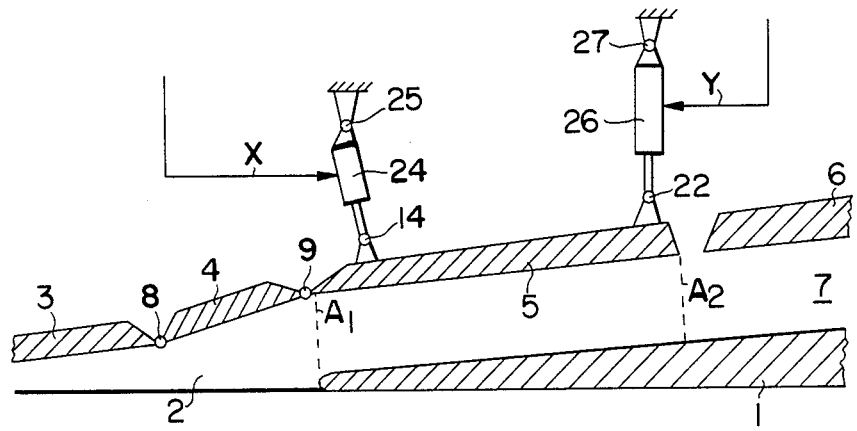
FIG. 4 illustrates a modification of the drive means for the movable diffuser wall section in which the respective drive means for moving a leading edge and a trailing edge of the movable diffuser wall section are controllabe independently of each other.

FIG. 4 shows a diffuser with the above described elements 1 to 9. The movable wall section 5 has the points 14 and 12 located on the side opposite of the diffuser channel, whereby point 14 is located near the inlet cross-section A1 and the point 22 is located near the outlet cross-section A2. A drive member 24 is effectively connected to point 14, and the drive member 24 is, in turn, journalled at 25 to the aircraft structure. A drive member 26 is correspondingly connected to the point 22, and the drive member 26 is, in turn, journalled at 27 to the aircraft structure. The leading edge of the wall section 5 can be adjusted by the drive member 24 in response to a signal x. Correspondingly, the trailing edge of the wall section 5 can be adjusted by the drive member 26 in response to a signal y. Thus, the inlet cross-sectional area A1 and the outlet cross-sectional area A2 of the diffuser are adjustable independently of each other.

FIG. 5 shows a diffuser having the above mentioned elements 1 to 9, 14, 22, and 24 to 27 including a sensor 28 and a computer unit 29 and 29a for each drive 24 and 26. The computer unit 29a is also connected to the sensor 28. The computer unit 29 ascertains, based on the flight data: speed, altitude, and temperature the optimal cross-sectional area A1 and adjusts it by means of the drive 24. The cross-sectional area A2 is adjusted by the unit 29a in such a manner that A2 assumes the respective largest value at which a flow separation does not yet take place. A flow separation announces itself by rapid pressure variations which are picked-up by the sensor 28 which supplies it to the unit 29a. The adjustment of A2 can also take place in accordance with other criteria, for example, through the variation of A2 a determined pressure ratio $p_2/p_1$ may be adjusted.

FIGS. 6 to 9 show known structural features for influencing the boundary layer. Such features may become necessary for the described diffuser within one or several of the zones I to III of FIG. 5. By means of the shown details, the boundary layer may be influenced by suction, splitting, or blowing out.

FIG. 6 shows accordingly a wall 4, 5 with bores 30, whereby a layer of the flow 31 close to the wall can be sucked to the side 32 of the wall.

Figure 7:
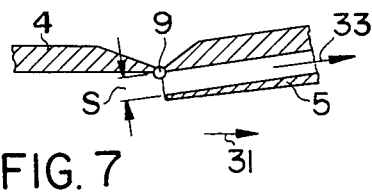

FIG. 7 shows the zone of the hinging point 9 between the walls 4 and 5. The leading edge 5 is pushed forward by a distance s into the flow 31. By this split-off step the flow layer coming in close to the wall is split off and led away in the direction of the arrow 33.

Figure 8:
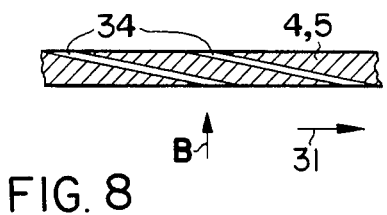

FIG. 8 shows a wall 4, 5 with a flow 31. The wall has slanted slots 34, whereby the air is blown into the flow in such a manner that the layers close to the wall are accelerated again.

Figure 9:
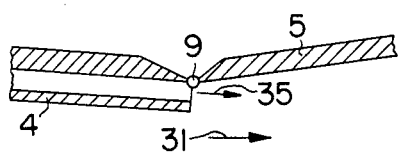

FIG. 9 shows a blow out stage arranged in the zone of the hinging point 9, whereby an airflow 35 is blown into the flow layers 31 close to the wall in such a way that these are accelerated again.

Figure 10:
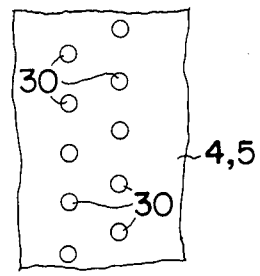

FIG. 10 shows the view A of FIG. 6 illustrating suction bores 30 located within a wall 4, 5.

Figure 11:
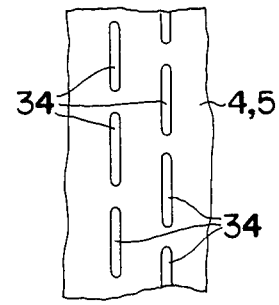

FIG. 11 shows the view B of FIG. 8 illucidating the form of blowout slots 34 arranged within a wall 4, 5.

The view A of FIG. 6 would be identical to FIG. 11 if the suction bores 30 were replaced by slots.

The drives 24 and 26 are illustrated, for example, as hydraulic cylinders. However, other types of drive are possible for the adjustment of the respective diffuser walls, for example, electric drives.

What we claim is:

1. A controllable diffuser for an air intake of an aircraft, comprising an air flow channel including an air inlet port, first means (11) for varying an inlet cross-sectional flow area (A1) of said air inlet port, an air outlet port, and second means (21, 22) for varying an outlet cross-sectional flow area (A2) of said air outlet port, said second means (21, 22) forming a backwardly facing step (23) in said outlet cross-sectional flow area (A2) for stabilizing a controlled boundary layer separation at said outlet cross-sectional flow area (A2).

2. The diffuser of claim 1, wherein said air flow channel comprises at least one wall section having a leading wall end next to said air inlet port and a trailing wall end adjacent said air outlet port, said first varying means being connected to said leading wall end for moving said leading wall end approximately crosswise to a flow direction through said air flow channel, said second varying means being connected to said trailing wall end for moving said trailing wall end approximately crosswise to said flow direction, for varying said inlet and outlet cross-sectional flow areas.

3. The diffuser of claim 2, wherein said first and second means for varying comprise a common lever linkage system connected to said leading and trailing wall ends defining said inlet and outlet cross-sectional flow areas (A1, A2), respectively, for moving said leading and trailing wall ends, said lever linkage system comprising a bell crank lever (11) which is so arranged that its rotation first causes a reduction in said inlet cross-sectional flow area until further rotation of said bell crank lever (11) also causes a reduction of said outlet cross-sectional flow area for the forming of said backwardly facing ramp (23) at said outlet flow area (A2).

4. The diffuser of claim 1, wherein said first and second means for varying comprise separate drive means for changing said inlet and outlet cross-sectional flow areas, said diffuser further comprising control means connected to said separate drive means for separately activating said separate drive means.

5. The diffuser of claim 1, wherein said air flow channel comprises at least one wall section (5) which is movable for varying said inlet and outlet cross-sectional flow areas, said diffuser further comprising drive means for said wall section, sensor means for sensing an optimal flow condition, and automatic control means connected to said sensor means and to said drive means for automatically moving said wall means into a position assuring an optimal flow condition through said diffuser.

6. The diffuser of claim 5, wherein said automatic control means are programmed control means for assuring an optimal flow condition for a flow through said diffuser.

7. The diffuser of claim 1, further comprising diffuser defining wall members (3, 4, 5), and suction holes at least in wall members (4, 5) for sucking off a boundary layer.

* * * * *